United States Patent
Whitehead, Jr. et al.

(10) Patent No.: US 12,282,502 B2
(45) Date of Patent: Apr. 22, 2025

(54) GENERATING SYNTHESIZED USER DATA

(71) Applicant: Sauce Labs Inc., San Francisco, CA (US)

(72) Inventors: Emmet James Whitehead, Jr., Santa Cruz, CA (US); Lena Reed, Palo Alto, CA (US); Afshin Mobramaein Kano, San Francisco, CA (US)

(73) Assignee: Sauce Labs Inc., San Francisco, CA (US)

(*) Notice: Subject to any disclaimer, the term of this patent is extended or adjusted under 35 U.S.C. 154(b) by 299 days.

(21) Appl. No.: 17/659,138

(22) Filed: Apr. 13, 2022

(65) Prior Publication Data
US 2023/0334071 A1     Oct. 19, 2023

(51) Int. Cl.
*G06F 16/00*     (2019.01)
*G06F 16/22*     (2019.01)
(Continued)

(52) U.S. Cl.
CPC .......... *G06F 16/3329* (2019.01); *G06F 16/22* (2019.01); *G06F 16/2228* (2019.01);
(Continued)

(58) Field of Classification Search
CPC .. G06F 16/3329; G06F 16/338; G06F 16/252; G06F 16/22; G06F 16/285;
(Continued)

(56) References Cited

U.S. PATENT DOCUMENTS

| 7,584,178 B2 * | 9/2009 | Dettinger ............ G06F 16/2455 |
| 7,912,862 B2 * | 3/2011 | Vaschillo .............. G06F 16/284 707/791 |

(Continued)

FOREIGN PATENT DOCUMENTS

| WO | WO2010038019 A2 * | 4/2010 |
| WO | WO 2018156551 A1 * | 8/2018 |

(Continued)

OTHER PUBLICATIONS

Iyad Alazzam et al., "Test Cases Selection Based on Source Code Features Extraction", International Journal of Software Engineering and Its Applications, vol. 8, No. 1 (2014), pp. 203-214.*

(Continued)

*Primary Examiner* — Srirama Channavajjala
(74) *Attorney, Agent, or Firm* — Weaver Austin Villeneuve & Sampson LLP

(57) ABSTRACT

Disclosed are examples of systems, apparatuses, methods, and computer program products for generating synthesized user data. A method may involve receiving a data specification schema. A method may involve determining a number of test data objects to be generated. A method may involve defining the test data objects, the defining of each test data object including: determining, from the data specification schema, a number of fields of the test data object to be populated, the fields representing categories of simulated user data; and determining values for the fields, the values simulating user data. The method may involve storing the test data objects in a database. The method may involve generating a tabular data file including or identifying the test data objects, the tabular data file configured to be processed by one or more processors of a computing system during a user data testing procedure of the computing system.

15 Claims, 8 Drawing Sheets

(51) Int. Cl.
*G06F 16/2458* (2019.01)
*G06F 16/25* (2019.01)
*G06F 16/28* (2019.01)
*G06F 16/31* (2019.01)
*G06F 16/3329* (2025.01)
*G06F 16/338* (2019.01)
*G06F 16/36* (2019.01)
*G06F 40/20* (2020.01)
*G06N 3/006* (2023.01)
*G06N 7/01* (2023.01)
*G06N 20/00* (2019.01)

(52) U.S. Cl.
CPC ........ *G06F 16/2477* (2019.01); *G06F 16/252* (2019.01); *G06F 16/285* (2019.01); *G06F 16/316* (2019.01); *G06F 16/338* (2019.01); *G06F 16/367* (2019.01); *G06F 40/20* (2020.01); *G06N 3/006* (2013.01); *G06N 7/01* (2023.01); *G06N 20/00* (2019.01)

(58) Field of Classification Search
CPC .... G06F 16/284; G06F 16/316; G06F 16/367; G06F 16/2228; G06F 16/2477; G06F 40/20; G06F 11/3684; G06F 11/3688; G06F 11/3692; G06F 11/3457; G06F 11/2635; G06F 11/3664; G06F 21/566; G06F 21/53; G06N 20/00; G06N 3/006; G06N 7/01
See application file for complete search history.

(56) References Cited

U.S. PATENT DOCUMENTS

| | | | | |
|---|---|---|---|---|
| 8,239,374 | B2 * | 8/2012 | Narula | G06F 16/245 707/634 |
| 8,549,480 | B2 * | 10/2013 | Cohen | G06F 11/366 717/113 |
| 9,286,290 | B2 * | 3/2016 | Allen | G06F 40/205 |
| 9,836,795 | B2 * | 12/2017 | Roberts | G06Q 40/08 |
| 10,013,679 | B1 * | 7/2018 | Lewis | G06F 40/40 |
| 10,311,055 | B2 * | 6/2019 | Thombre | G06F 16/2453 |
| 11,341,033 | B2 * | 5/2022 | Mohankumar | G06F 18/24323 |
| 2002/0128993 | A1 * | 9/2002 | Jevons | G16B 50/00 |
| 2006/0235835 | A1 * | 10/2006 | Dettinger | G06F 16/2425 |
| 2011/0276944 | A1 * | 11/2011 | Bergman | G06F 11/3684 717/124 |
| 2015/0066986 | A1 * | 3/2015 | Piecko | G06F 16/284 707/779 |
| 2015/0082277 | A1 * | 3/2015 | Champlin-Scharff | G06F 11/3664 717/120 |
| 2018/0293115 | A1 * | 10/2018 | Skeem | G06F 16/252 |
| 2018/0365316 | A1 * | 12/2018 | Liang | G06F 16/3323 |
| 2019/0163790 | A1 * | 5/2019 | Jennings | G06F 16/2465 |
| 2021/0073110 | A1 * | 3/2021 | Vidal | G06N 20/00 |
| 2021/0193146 | A1 * | 6/2021 | Kirazci | G06F 3/167 |
| 2021/0279165 | A1 * | 9/2021 | Rubin | G06F 11/3684 |
| 2022/0138004 | A1 * | 5/2022 | Nandakumar | G06N 20/00 718/102 |
| 2023/0007894 | A1 * | 1/2023 | Bussa | G06F 8/60 |
| 2023/0012264 | A1 * | 1/2023 | Venugopal | G06F 11/3075 |
| 2023/0073312 | A1 * | 3/2023 | Portisch | G06F 16/258 |
| 2023/0139783 | A1 * | 5/2023 | Garib | G06N 3/044 707/769 |

FOREIGN PATENT DOCUMENTS

WO WO 2019023509 A1 * 1/2019
WO WO2021086669 A1 * 5/2021

OTHER PUBLICATIONS

Dessislava Petrova-Antonova et al.,Automatic generation of test data for XML schema-based testing of web services , 2015 10th International Joint Conference on Software Technologies (ICSOFT), 2015, pp. 1-8.*
Chennamsetty Madhusudhana Rao et al., "A Comparative Study of NLP based Semantic Web Standard model using SPARQL database", 2021 International Conference on Computing Sciences (ICCS) (pp. 1-6).*
J. Leopold et al., "A visual query system for the specification and scientific analysis of continual queries", Proceedings IEEE Symposia on Human-Centric Computing Languages and Environments (Cat. No.01TH8587) (2001, pp. 203-211).*
Eliza Kuttner et al., "Processing natural language with schema constraint networks", Computers & Mathematics with Applications, vol. 24, Issue 11, Dec. 1992, pp. 3-10.*
"Announcing AI21 Studio and Jurassic-1 Language Models," AI21 labs, 5 pages, URL: https://www.ai21.com/blog/announcing-ai21-studio-and-jurassic-1.
Cellat S., "Fine-Tuning Transformer-Based Language Models," Y Meadows, 2021, 8 pages.
Garbade M. J., "Understanding few-shot learning in machine learning," Medium, 2018, 5 pages.
"GPT-Neo," EleutherAI, 2 pages, URL: https://www.eleuther.ai/projects/gpt-neo/.
Kulshrestha R., "Transformers," Transformers in NLP: A beginner friendly explanation, Towards Data Science, 2020, 14 pages.
Lieber, et al., "Jurassic-1: Technical Details and Evaluation," White Paper, 9 pages.
Osborne S., "Learning NLP Languages Models with Real Data," Towards Data Science, 2019, 24 pages, URL: https://towardsdatascience.com/learning-nlp-language-models-with-real-data-cdff04c51c25.
"Prompt Engineering Tips and Tricks with GPT-3," andrew makes things, Apr. 21, 2021, 6 pages.
"Zero-Shot Learning in Modern NLP," State-of-the-art NLP models for text classification without annotated data, Joe Davison Blog, May 29, 2020, 14 pages.

* cited by examiner

```
{
    "name": "SchoolExample",
    "n_items" : 6,
    "fields": [{
        "name" : "first_name",
        "aliases": [],
        "generator_type": "FakerGenericGenerator",
        "generator_params": {"function_name": "first_name"}
    },
    {
        "name": "last_name",
        "aliases": [],
        "generator_type": "FakerGenericGenerator",
        "generator_params": {"function_name": "last_name"}
    },
    {
        "name":"english_grade",
        "aliases":[

],
        "generator_type":"IntegerRangeGenerator",
        "generator_params":{
          "begin":0,
          "end":100
        },
    "constraints" : [
        {"expression": " True if english_grade > 40 else False ","names":{},"output_name":"passed_english","return":true}
        ]
}
```

202 — "name": "SchoolExample", "n_items" : 6,
204 — first_name field
206 — last_name field
208 — english_grade field
210 — constraints

FIG. 2A

|     | first_name (252) | last_name (254) | english_grade (256) | passed_english (258) |
|-----|------------|-----------|---------------|----------------|
| 260 | Jorge      | Burgess   | 42            | TRUE           |
| 262 | Ashley     | Miller    | 33            | FALSE          |
| 264 | Derek      | Bates     | 9             | FALSE          |
| 266 | Justin     | Thomas    | 50            | TRUE           |
| 268 | Brian      | Black     | 41            | TRUE           |
| 270 | Sara       | Ball      | 36            | FALSE          |

```
{                                          302
    "n_items":3,
    "fields":[
        {                                                  304
            "name":"FaveNicCageMovie",
            "aliases": [],
            "generator_type":"DBPediaGenerator",
            "generator_params":{                            306
                "query":"PREFIX dbo: <http://dbpedia.org/ontology/> PREFIX res: <http://
dbpedia.org/resource/> PREFIX rdf: <http://www.w3.org/1999/02/22-rdf-syntax-ns#>
PREFIX rdfs: <http://www.w3.org/2000/01/rdf-schema#>SELECT DISTINCT ?uri ?string
WHERE { ?uri rdf:type dbo:Film .    ?uri dbo:starring res:Nicolas_Cage . OPTIONAL
{?uri rdfs:label ?string . FILTER (lang(?string) = 'en') }}",
                "colnames":["string"]
            }
        },
        {                                                  308
            "name":"ThoughtsOnNicCage",
            "aliases":[],                         309
            "generator_type":"Jurassic1Generator",
            "generator_params":{              310
                "prompt":"I think Nicolas Cage is ",
                "apitoken":[[API TOKEN]], — 312
                "num_results":16,
                "max_tokens":8, — 314
                "stop_sequences":["."], — 316
                "topKReturn" : 0,
                "temperature": 0.7, — 318
                "model": "j1-large", — 320
                "is_batch":true
            }
        }
    ]
}
```

| | FavNicCageMovie (352) | ThoughtsonNicCage (354) |
|---|---|---|
| 356 | Leaving Las Vegas | I think Nicolas Cage is really tall. |
| 358 | Con Air | I think Nicolas Cage is underrated. |
| 360 | Bangkok Dangerous | I think Nicolas Cage is very talented. |

*FIG. 3B*

GENERATING SYNTHESIZED USER DATA

BACKGROUND

The testing of software applications is a bottleneck in the pipeline between developers and end users. The diversity of devices, operating systems, and web browsers, coupled with the rapid pace at which new versions of each become available, makes it difficult to ensure compatibility and reliable operation of a new application with a significant portion of the possible combinations in a timely manner.

Applications may need to be tested on possible user inputs. In some cases, user input (e.g., as input in a form field) may include natural language. Because language can be so varied, it can be difficult to test an application on real user data. Moreover, testing an application using real user data may present a security risk, as the real user data may be leaked or inappropriately accessed, thereby causing a security breach.

SUMMARY

Disclosed herein are methods for generating synthesized user data. In some embodiments, a method may involve receiving a data specification schema. The method may involve determining a number of test data objects to be generated. The method may involve defining the test data objects, the defining of each test data object including: determining, from the data specification schema, a number of fields of the test data object to be populated, the fields representing categories of simulated user data; and determining values for the fields, the values simulating user data. The method may involve storing the test data objects in a database, the storing of each test data object including populating the fields with the determined values. The method may involve generating a tabular data file including or identifying the test data objects, the tabular data file configured to be processed by one or more processors of a computing system during a user data testing procedure of the computing system.

Disclosed herein are systems for generating synthesized user data. In some embodiments, a system may include a memory and one or more processors operatively coupled to the memory. In some embodiments, the one or more processors may be configured to cause receiving a data specification schema. The one or more processors may be configured to cause determining a number of test data objects to be generated. The one or more processors may be configured to cause defining the test data objects, the defining of each test data object including: determining, from the data specification schema, a number of fields of the test data object to be populated, the fields representing categories of simulated user data; and determining values for the fields, the values simulating user data. The one or more processors may be configured to cause storing the test data objects in a database, the storing of each test data object including populating the fields with the determined values. The one or more processors may be configured to cause generating a tabular data file including or identifying the test data objects, the tabular data file configured to be processed by one or more processors of a computing system during a user data testing procedure of the computing system.

Disclosed herein are computer program products comprising computer readable program code for generating synthesized user data. In some embodiments, the program code may be capable of being executed by one or more processors when retrieved from a non-transitory computer-readable medium. In some embodiments, the program code may comprise instructions configurable to cause receiving a data specification schema. The instructions may be configurable to cause determining a number of test data objects to be generated. The instructions may be configurable to cause defining the test data objects, the defining of each test data object including: determining, from the data specification schema, a number of fields of the test data object to be populated, the fields representing categories of simulated user data; and determining values for the fields, the values simulating user data. The instructions may be configurable to cause storing the test data objects in a database, the storing of each test data object including populating the fields with the determined values. The instructions may be configurable to cause generating a tabular data file including or identifying the test data objects, the tabular data file configured to be processed by one or more processors of a computing system during a user data testing procedure of the computing system.

BRIEF DESCRIPTION OF THE DRAWINGS

FIGS. 2A and 2B illustrate an example data specification schema and corresponding example generated synthesized user data, respectively, in accordance with some embodiments.

FIGS. 3A and 3B illustrate an example data specification schema and corresponding example generated synthesized user data, respectively, in accordance with some embodiments.

DETAILED DESCRIPTION

Figure 1:
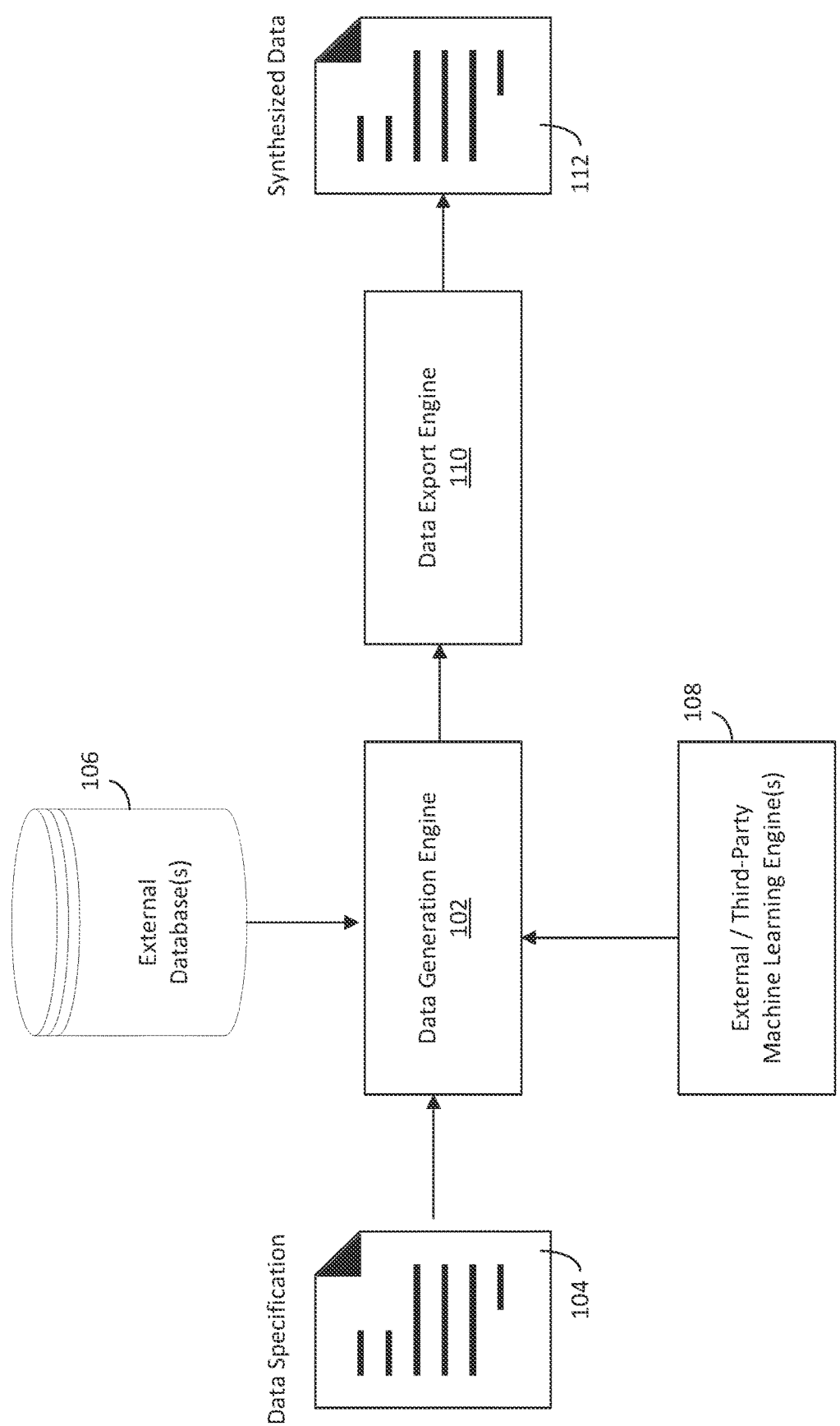
FIG. 1 is diagram of a system for generating synthesized user data in accordance with some embodiments.

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

When testing applications or other programs, it can be desirable to use realistic testing data that spans the range of potential user inputs, for example, to capture how the application or program responds to different user inputs. In the case of user data, it can be difficult to obtain real user data, because doing so may pose a security risk and/or a privacy risk. However, it can be difficult to generate realistic user data that both captures the range of potential user inputs and is sufficiently realistic to provide suitable test data for an application or program. Generating such realistic data may be time-intensive, computationally-intensive, and/or require a lot of manual effort. Moreover, testing an application or program with non-realistic user data and/or too small of a test set may result in applications or programs that frequently break or throw errors.

The techniques disclosed herein provide methods, systems, and media for generating synthesized user data. In particular, the techniques described herein allow a user (e.g., a user associated with an application or program to be tested) to specify characteristics of test data to be generated in a data specification schema. The data specification schema may specify, for example, a number of test data objects to be generated, a number of fields associated with each test data object (where each field may correspond to a category of user data), and parameters associated with a value to be generated in connection with each field. The parameters associated with the value may specify a manner in which the value is to be generated, for example, by specifying a particular type of generator to be used. Examples of generators include a random number generator, a mathematical operation or other function, a particular third-party algorithm (e.g., a machine learning algorithm, a natural language processing algorithm, etc.), a particular external database, or the like.

By way of example, a data specification schema may specify that a test data object is to have a field corresponding to a user phone number, and the data specification schema may further specify an external or third-party algorithm that is to be used to generate the value associated with the field (i.e., the phone numbers). Continuing with this example, the data specification schema may further specify parameters or constraints associated with generated values, such as that a generated phone number is to be one suitable for a particular geographic region (e.g., a particular country, a particular region of a country, etc.). These parameters may be provided to the external or third-party algorithm such that the algorithm utilizes the parameter to generate values for the field for each test data object. Moreover, because such an external algorithm may itself be an extensively trained machine learning algorithm, the generated values may be realistic in that they conform to expected use inputs suitable for testing an application or program.

Because the data specification schema may support calls to user-specified functions, external algorithms, external databases, and the like, the techniques described herein may allow a user to generate a large quantity of realistic test user data that includes essentially any type of data. For example, a machine learning algorithm or natural language process algorithm may be used to generate realistic conversational text (e.g., associated with a comment or review, a food delivery order, or the like). As another example, an external database may be queried to identify names of particular types of media content (e.g., a particular genre of movie, movies starring a particular actor, etc.). As yet another example, the data specification schema may specify operations to be performed on values of one or more fields in order to generate a value for another field for a particular test data object, thereby allowing the data specification schema to be customizable and flexible for a variety of application testing requirements.

In some implementations, the resulting synthesized user data may be stored and provided as tabular data. The tabular data may be stored in any format, such as a comma-separated value (CSV) file, an extended markup language (XML) file, a JavaScript Object Notation (JSON) file, an EXCEL (XLSX) file, or the like. By providing the synthesized user data in a tabular data file, the synthesized user data may be easily used by an application or program tester without having to clean or re-format the synthesized user data.

The techniques described herein may serve to improve the efficiency and accuracy of applications and programs. For example, by generating a sufficiently large and robust test data set (e.g., that accurately captures variations in realistic user data), applications and programs may be more effectively tested. This may in turn allow applications and programs to function more efficiently, e.g., by reducing downtime required for bug fixes.

Turning to FIG. 1, a diagram of an example system for generating synthesized user data is shown in accordance with some embodiments.

As illustrated, a data generation engine 102 may receive, as an input, a data specification 104. Note that specific examples of data specification schemas are shown in and described below in connection with FIGS. 2A and 3A. Data specification schema 104 may indicate various specifications for the synthesized user data generated by data generation engine 102. For example, data specification schema 104 may indicate a number of test data objects to be generated. As a more particular example, data specification schema 104 may indicate that 50, 100, 500, 1000, 10,000, etc. test data objects are to be generated. As another example, data specification schema 104 may indicate a number of fields associated with each generated test data object. In some implementations, each field may be a category of simulated user data. Examples of categories include: user age, user name, user address, conversational text (e.g., corresponding to a food delivery order, corresponding to a response to a telephone prompt, corresponding to a response to a question, etc.), a name of a particular type of media content (e.g., a name of a book, a name of a movie, a name of a movie starring a particular actor, etc.), a price for a particular item for sale, a phone number, an address, or the like.

As yet another example, data specification schema 104 may indicate a manner in which a value for each specified field is to be generated. As a more particular example, data specification schema 104 may indicate that the value is to be a randomly generated value (e.g., a randomly generated numeric value, a randomly generated value selected from a particular closed set, etc.). As another more particular example, data specification schema 104 may indicate that the value is to be the result of an operation (e.g., a mathematical operation, a logical operation, etc.) on one or more other values indicated in data specification schema 104. As a specific example, data specification schema 104 may indicate that the value is to be based on a Boolean operator applied to one or more other values indicated in data specification schema 104, that the value is to be based on a mathematical function (e.g., addition, subtraction, averaging, etc.) of two or more other values indicated in data specification schema 104, or the like. As still another more particular example, data specification schema 104 may specify a particular third-party algorithm or database that is to be utilized to generate the value associated with a particular field. In some implementations, the third-party algorithm may be a machine learning algorithm and/or a natural language processing algorithm (which may be pre-trained) that generates conversational text. In some implementations, the third-party algorithm or database may be accessed using an application programming interface (API). In some such implementations, data specification schema 104 may specify an API token that authenticates an entity associated with data specification schema 104 to utilize the third-party algorithm or database.

As illustrated in FIG. 1, data generation engine 102 may interface with an external database 106. External database 106 may store any suitable type of information, such as media content information (e.g., names of movies or television shows, names of actors or actresses appearing in various movies or television shows, plot summaries, episodic information, names of books, authors of books, etc.), geographical information (e.g., names of cities in various countries, telephonic area codes associated with different geographic regions, etc.), and/or any other suitable type of information. Examples of databases include DBpedia and Wikidata, although it should be understood that any suitable database may be accessed by data generation engine 102. In some implementations, a query language, such as SPARQL, may be used to query an external database. In some implementations, data generation engine 102 may query external database 106 by transmitting a query to external database 106. In some embodiments, the query may be specified in data specification schema 104, for example, in connection with a particular field for which external database 106 is to be accessed (e.g., in order to generate a value associated with the field).

In some implementations, data generation engine 102 may interface with external and/or third-party machine learning engine(s) 108. Examples of such machine learning engine(s) include Jurassic-1, GPT-Neo, Faker, and Tracery, although it should be understood that any suitable machine learning algorithm(s) and/or natural language processing algorithm(s) may be used. In some embodiments, external and/or third-party machine learning engine(s) 108 may be used to generate a value for a particular field. For example, the value may include conversational text (e.g., a realistic user response to a prompt or question), a realistic name of a user, a realistic user address, etc. In some implementations, data generation engine 102 may provide a prompt or seed to external and/or third-party machine learning engine(s) 108, such as a country name associated with a realistic address to be provided, a beginning of a sentence for which the end of the sentence is to be generated, or the like. In some such implementations, the prompt or seed may be specified in data specification schema 104. Additionally or alternatively, in some embodiments, data specification schema 104 may specify a number of words or phrases to be provided by external and/or third-party machine learning engine(s) 108 and/or a format of the content to be provided by external and/or third-party machine learning engine(s) 108. For example, data specification schema 104 may specify that an address conforming to characteristics of addresses in a particular country is to be provided. As another example, data specification schema 104 may specify that a phrase that completes a particular sentence beginning is to be provided, the phrase having a specified maximum and/or minimum number of words and/or a specified stop token.

In some implementations, data generation engine 102 may parse data specification schema 104 to determine the number of test data objects to be provided, the number of fields associated with each test data object, and/or a category of user data associated with each field. Data generation engine 102 may then determine how values are to be generated for each field, e.g., a generator (e.g., a particular external algorithm to be used, a particular database to be accessed, a particular user-specified function to be used, a particular operation to be performed, etc.) to be used to generate the value, whether the value is to conform to particular constraints, etc. Data generation engine 102 may then generate, or direct generation, of values for each field. This process may be repeated for each test data object. More detailed techniques for generating test data objects are shown in and described below in connection with FIG. 4.

After generating the test data objects, data generation engine 102 may provide the test data objects (or information representative of the generated test data objects) to data expert engine 110. Data export engine 110 may then generate synthesized data 112. Synthesized data 112 may be tabular data. For example, in some implementations, synthesized data 112 may be provided in the format of a table, where each row corresponds to a test data object, and each column corresponds to a different field specified in data specification schema 104. Continuing with this example, for a particular row, the element associated with a particular column may correspond to the value generated by data generation engine 102 for that particular test data object and for the corresponding field. Synthesized data 112 may be provided in any suitable format, such as a CSV file, an XLSX file, an XML, file, a JSON file, or the like. In some embodiments, the format may be specified by the user requesting the synthesized user data, e.g., in data specification schema 104.

FIG. 2A shows an example of a portion of a data specification schema 200 in accordance with some embodiments. Data specification schema 200 may be utilized to generate tabular data related to student grades in the context of a school class. In particular, the tabular data generated by data specification schema 200 includes, for each test data object: student first name; student last name; a numeric grade for English class; and a Boolean value indicating whether the student passed English class. It should be noted that although data specification schema 200 utilizes JSON notation, in some implementations, a data specification schema may utilize any suitable type of markup or scripting language suitable for indicating fields, a manner in which a value for a particular field is to be generated, or the like.

As illustrated, data specification schema 200 includes a block 202 which may be used to indicate a number of test data objects to be generated. For example, block 202 indicates that 6 test data objects are to be generated. It should be noted that the number of items used in data specification schema 200 is merely an example, and any suitable number of test data objects may be indicated (e.g., 20, 50, 100, 1,000, 10,000, etc.).

Data specification schema 200 includes a block 204 corresponding to a first field of a given test data object. As shown in FIG. 2A, the first field is "first_name," e.g., a first name of a student. As illustrated in block 204, data specification scheme 200 indicates that the Faker algorithm is to be used to generate values of the first field (i.e., via the code "generator_type":"FakerGenericGenerator"), where the Faker algorithm is one which may be used to provide realistic text for a specified category. Examples of categories include: first name; last name; addresses; and currencies (e.g., currencies associated with a particular country). Additionally, block 204 indicates that "FakerGenericGenerator" is to be called with a function "first_name" that indicates that the specified generator (i.e., "FakerGenericGenerator") is to provide a value suitable for a first name. Similarly, data specification schema 200 includes a block 206 corresponding to a second field of a given test data object. As shown in FIG. 2A, the second field is "last_name," e.g., the last name of a student. As illustrated in block 206, data specification schema 200 indicates that the Faker algorithm is to be used to generate values of the second field.

Data specification schema 200 includes a block 208 corresponding to a third field of a given test data object. As shown in FIG. 2A, the third field is "english_grade," e.g., an assigned grade for a particular student for English class. As illustrated in block 208, data specification schema 200 indicates that values for third field are to be generated using an integer number range having a value between 0 and 100, as indicated by the code:

```
"generator_type": "IntegerRangeGenerator",
"generator_params": {
   "begin":0,
   "end":100
}
```

Using the above code specified in data specification schema 200, for each test data object, an integer between 0 and 100 may be randomly selected and assigned to the third field, "english_grade."

Data specification schema 200 includes a block 210 corresponding to a fourth field of a given test data object. As shown in FIG. 2A, the fourth field is "passed_english." As specified in data specification schema 200, a value of the fourth field may be dynamically determined based on a value of another field specified in data specification schema 200. In particular, the value of "passed_english" is a Boolean value that is generated based on a value of the third field, "english_grade" for the same test data object. In particular, the value of the fourth field may be set to "True" if the value of "english_grade" is greater than 40, and set to "False" otherwise.

FIG. 2B illustrates an example of tabular data 250 that may be generated by a data generation engine (e.g., data generation engine 102 of FIG. 1) that receives data specification schema 200 of FIG. 2A as an input. As illustrated, tabular data 250 includes four columns, 252, 254, 256, and 258. Each column corresponds to a field specified in data specification schema 200. For example, column 252 corresponds to the first field ("first_name") specified in data specification schema 200. Continuing with this example, column 254 corresponds to the second field ("last_name") specified in data specification schema 200, column 256 corresponds to the third field ("english_grade") specified in data specification schema 200, and column 258 corresponds to the fourth field ("passed_english") specified in data specification schema 200. It should be noted that the column heading associated with each column in tabular data 250 corresponds to the corresponding field name specified in data specification schema 200.

Additionally, tabular data 250 includes 6 rows (260, 262, 264, 266, 268, and 270), each row corresponding to a different generated test data object. It should be noted that tabular data 250 includes 6 rows because data specification schema 200 specified that 6 data objects were to be created. For a given test data object, the value for a particular field has been generated based on the parameters specified in data specification schema 200. For example, for a given test data object, the values associated with "first_name" and "last_name" have been generated by the Faker algorithm utilizing the "first_name" and "last_name" functions, respectively, as specified in data specification schema 200. As another example, for a given test data object, the value associated with "english_grade" is an integer value between 0 and 100, as specified in data specification schema 200. As yet another example, for a given test data object, the value associated with "passed_english" is a Boolean value determined based on the value associated with "english_grade," as specified in data specification schema 200.

FIG. 3A shows an example of a portion of a data specification schema 300 in accordance with some embodiments. Data specification schema 300 may be utilized to generate tabular data that includes names of movies that include a particular actor and conversational text that begins with a particular beginning phrase specified in data specification schema 300.

As illustrated, data specification schema 300 includes a block 302 which may be used to indicate a number of test data objects to be generated. For example, block 302 indicates that 3 test data objects are to be generated. It should be noted that the number of items used in data specification schema 300 is merely an example, and any suitable number of test data objects may be indicated (e.g., 20, 50, 100, 1,000, 10,000, etc.).

Data specification schema 300 includes a block 304 corresponding to a first field of a given test data object. In the example shown in FIG. 3A, the name associated with the first field is "FaveNicCageMovie." Block 304 indicates a specific database that is to be queried to generate values of test data objects corresponding to the first field. In particular, via the code "generator_type" : "DBPediaGenerator"), block 304 indicates that the DBPedia database is to be used. Additionally, via block 306, data specification schema 300 indicates a specific query that is to be provided to the indicated database to generate values for test data objects for the first field. In particular, block 306 indicates that the database is to be queried for movies starring Nicolas Cage.

Data specification schema 300 includes a block 308 corresponding to a second field of a given test data object. In the example shown in FIG. 3A, the name associated with the second field is "ThoughtsOnNicCage." Block 308 includes parameters usable to generate conversational text that completes a sentence starting phrase specified in data specification schema 300. In particular, line 309 indicates a particular algorithm (Jurassic-1, in the example shown in FIG. 3A) to be used to generate conversational text. Line 310 specifies a prompt (e.g., a beginning phrase of a sentence) to be used by the algorithm, in particular, "I think Nicolas Cage is . . . " Line 312 indicates an API token that authenticates an entity using data specification schema 300 to utilize the algorithm specified in line 309. Note that the API token has been obscured in the example shown in FIG. 3A, and "[[API Token]]" may be replaced by a real API token in line 309. Line 314 indicates a maximum number of words in the conversational text returned by the algorithm, e.g., 8 words in the example shown in FIG. 3A. Note that the maximum number of words may be any suitable number, e.g., 1, 5, 10, etc. Line 316 indicates a stop sequence (i.e., a period) to be used by the algorithm when returning conversational text. Line 318 indicates a value of a temperature hyperparameter used by the algorithm specified in line 309. In particular, the temperature value specified in line 318 indicates a degree of diversity and/or predictability of the conversational text results provided by the algorithm, where a higher value (e.g., closer to 1) indicates less predictability, or more diversity in the returned conversational text results, relative to a lower value (e.g., closer to 0). Line 320 specifies a particular model version of the algorithm specified in line 309 to be used, in particular, the "j1-large" model.

FIG. 3B illustrates an example of tabular data 350 that may be generated by a data generation engine (e.g., data generation engine 102 of FIG. 1) that receives data specification schema 300 of FIG. 3A as an input. As illustrated, tabular data 350 includes two columns, column 352 and 354.

Each column corresponds to a field indicated in data specification schema 300 of FIG. 3A. For example, column 352 corresponds to the first field of data specification schema 300 (i.e., "FaveNicCageMovie") and column 354 corresponds to the second field of data specification schema (i.e., "ThoughtsOnNicCage"). Note that the column headings of columns 352 and 354 of tabular data 350 correspond to the field names specified in blocks 304 and 308 of data specification schema 300, respectively.

Tabular data 350 includes three rows, 356, 358, and 360, each corresponding to a generated test data object. Note that tabular data 350 indicates three generated test data objects because data specification schema 300 indicates that 3 test data objects are to be generated. Each element within a particular row represents a value of the corresponding column. For example, with respect to row 356, the value of the field "FavNicCageMovie" that was generated is "Leaving Las Vegas." Continuing with this example, for the same test data object represented in row 356, the value of the field "ThoughtsOnNicCage" is "I think Nicolas Cage is really tall." Note that, for each test data object, values of the first field (i.e., those indicated in column 352) were generated by querying the database specified in data specification schema 300 (i.e., the DBPedia database) with the query specified in data specification schema 300 (i.e., movies starring Nicolas Cage). Continuing with this example, for each test data object, values of the second field (i.e., those indicated in column 354) were generated by utilizing the algorithm specified in data specification schema 300 (i.e., the Jurassic-1 natural language processing algorithm) with the parameter values specified in data specification schema 300 (e.g., the maximum number of tokens in the generated conversational text, the stop token of the generated conversation text, the prompt or beginning sentence phrase to be used to initialize the natural language processing algorithm, the temperature hyperparameter, and the specific model to be used).

In some implementations, a data generation engine (e.g., data generation engine 102, as shown in and described above in connection with FIG. 1) may receive, as an input, a data specification schema. The data specification schema may be in a JSON format, an XML, format, and/or in any other suitable format. The data generation engine may parse the data specification schema. For example, from the data specification schema, the data generation engine may identify a number of test data objects to be generated, a number of fields associated with each test data object, and a category associated with each field (e.g., whether the value generated for a particular field is numeric data, numeric data within a particular range, a result of an operation performed on one or more values associated with other fields, conversational text, a first name of a user, a last name of a user, a name of a particular type of media content, an address, an amount of a particular type of currency, and/or any other suitable type of category). The data generation engine may identify, for each field, a manner in which a corresponding value for the field is to be generated based on the data specification schema. For example, the data generation engine may determine that the value is to be generated using a random number generator, by randomly selecting from a closed set of candidate values, by utilizing a particular machine learning algorithm or natural language processing algorithm, by querying a particular database, and/or by performing an operation on one or more values associated with other fields. In instances in which an external algorithm or database is to be used, the data generation engine may identify, from the data specification schema, any parameters, model hyperparameters, and/or query information to be utilized. Responsive to determining that all test data objects have been generated, the test data objects (or information associated with the test data objects) may be utilized by a data export engine (e.g., data export engine 110 of FIG. 1) to generate tabular data. The tabular data may be in a CSV format, an XLSX format, an XML format, a JSON format, and/or in any other suitable format.

Figure 4:
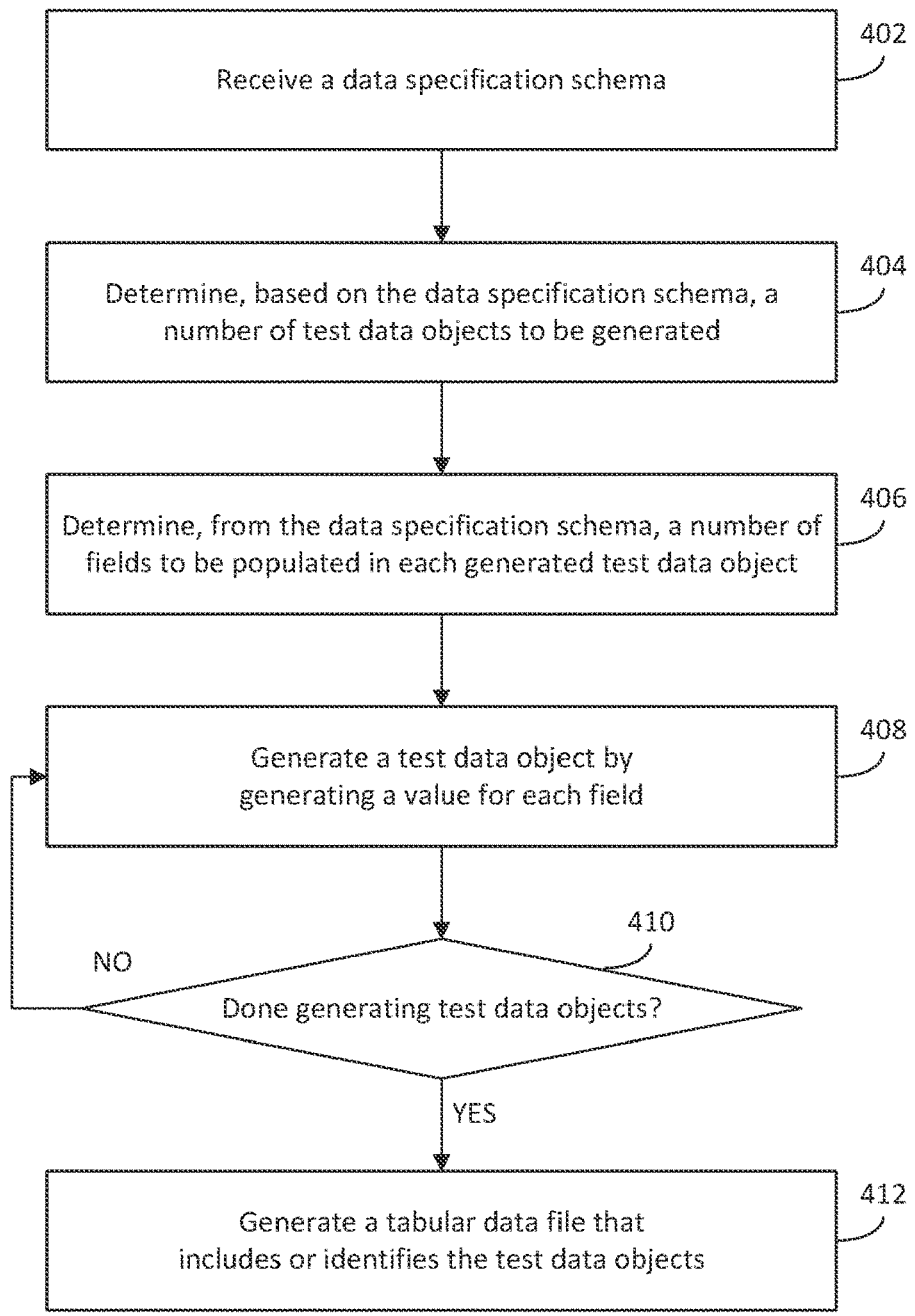
FIG. 4 is a flowchart of an example process for generating synthesized user data in accordance with some embodiments.

FIG. 4 shows a flowchart of an example process 400 for generating synthesized user data in accordance with some embodiments. In some implementations, blocks of process 400 may be executed by a data generation engine (e.g., data generation engine 102 of FIG. 1) and/or a data export engine 110 of FIG. 1). In some implementations, blocks of process 400 may be executed in an order other than what is shown in FIG. 4. In some embodiments, two or more blocks of process 400 may be executed substantially in parallel. In some embodiments, one or more blocks of process 400 may be omitted. It should be noted that, in some implementations, process 400 may be executed on one or more server devices. In such implementations, interfacing with the one or more server devices may include using various APIs and/or graphical user interfaces (GUIs), such as the REST API, or the like. In some implementations, blocks of process 400 may execute on a local device, such as a desktop computer, a laptop computer, a mobile device, etc.

Process 400 can begin at block 402 by receiving a data specification schema. In some implementations, process 400 can receive the data specification schema via a user interface. For example, the user interface may include any suitable user interface controls to, e.g., navigate directory structures and select a file corresponding to the data specification schema. As described above in connection with FIGS. 1, 2A, and 3A, the data specification schema may be in a JSON format. Alternatively, in some embodiments, the data specification schema may be in an XML, format, and/or in any other suitable format suitable for specifying field names and parameters to be utilized to generate values associated with each field.

At 404, process 400 can determine, based on the data specification schema, a number of test data objects to be generated. For example, as described above in connection with FIGS. 2A and 3A, the number of test data objects may be explicitly specified in the data specification schema. As another example, in some implementations, the number of test data objects may not be explicitly specified in the data specification schema. In some such implementations, process 400 may identify the number of test data objects to be generated as a pre-determined default number. Examples of a pre-determined default number include 50 test data objects, 100 test data objects, 500 test data objects, 1,000 test data objects, 10,000 test data objects, etc.

At 406, process 400 can determine, from the data specification schema, a number of fields to be populated in each generated test data object. In some implementations, process 400 may determine the number of fields to be populated in connection with each generated test data object by parsing the data specification schema to identify a number of blocks that specify fields. For example, referring to the specific examples shown in FIGS. 2A and 3A, process 400 may identify a number of "name" entries within a block of code specifying the various fields. It should be noted that, in some embodiments, each field may be associated with a category of user data, such as a name of a user, an integer value, a non-integer numeric value, a name of a particular type of media content, conversational text, a phone number, an address, etc.

At 408, process 400 can generate a test data object by generating a value for each field (e.g., each field identified at block 406). In some implementations, process 400 can generate the value by, for each field, identifying a manner in which the value is to be generated. For example, in some embodiments, process 400 can parse the data specification schema to identify, for the field, a generator to be used to generate the value. Examples of generators include a numeric generator (e.g., a random integer generator, etc.), a selection function that selects from a closed set of candidate values (where the closed set of candidate values may be specified in the data specification schema), a particular algorithm (e.g., a machine learning algorithm, a natural language processing algorithm, etc.), a particular database to be queried, etc. Examples of algorithms that may be used include Faker (e.g., to generate first and/or last names, addresses associated with a particular geographic region, phone numbers associated with a particular geographic region, currency denominations, etc.), Tracery (e.g., to generate produce names, stock keeping units (SKUs), simple text corresponding to reviews of products or other comments, simple conversational text, etc.), natural language processing algorithms such as Jurassic-1 or GPT-Neo (e.g., to generate more complex conversational text), or the like. Examples of databases that may be queried include DBpedia, Wikidata, or the like. An example of a query language that may be used to query a database is SPARQL, although it should be understood that any suitable query language may be used.

As described above in connection with FIG. 2A, process 400 may generate a value for a particular field by generating a random value (e.g., a random integer value). In some embodiments, process 400 may generate the random value to conform to particular constraints, such as a random integer that is within a particular range. In some implementations, process 400 may generate the value for the particular field by randomly selecting an element from a closed set. By way of example, in an instance in which the field is a pizza topping, process 400 may select the value for the field randomly from a closed set of potential values specified in the data specification schema received at block 402. Continuing with this example, in an instance in which the closed set of potential values include: {olives; mushrooms; pepperoni}, process 400 may select the value as being one of olives, mushrooms, and pepperoni. It should be noted that, in some embodiments, the data specification schema may indicate whether multiple values may be selected from the closed set (e.g., whether both olives and mushrooms may be selected, in the example given above), and, in such instances, a maximum and/or minimum number of elements that may selected for a single value of a test data object.

Note that parameters or hyperparameters to be utilized in connection with calling a particular algorithm to generate the value associated with the field may be specified in the data specification schema, as described above in connection with FIGS. 2A and 3A. Examples of parameters or hyperparameters include: a particular category of data that is to be generated (e.g., a first name, a last name, an address, a phone number, an address, conversational text, etc.), a country name or other geographic information (e.g., such that any addresses or phone numbers generated are realistic in the context of the geographic information), a degree of randomness or diversity in generated conversational text (e.g., as specified in a temperature parameter), a particular model to use, a prompt or seed to be provided to an algorithm, a number of words or other tokens to be generated, a stop token to be used in generated conversational text, or the like.

Additionally, in instances in which a generator to be used is a particular database, the data specification schema may specify a particular query to be used when querying the database.

In some implementations, process 400 may parse the data specification schema to identify an operation to be performed to generate the value for the field. In some embodiments, the operation may include a mathematical operation performed on one or more values associated with other fields. Examples of mathematical operations include finding a maximum or minimum of values associated with multiple fields, determining an average of values associated with multiple fields, adding values associated with multiple fields, etc. In some implementations, the operation may include determining a Boolean value based on values associated with one or more other fields, as in the example given in FIG. 2B. Note that, in some implementations, a particular operation may be specified using a scripting language, such as Python, or the like.

It should be noted that, in some implementations, process 400 may perform any suitable verification process or modification process to ensure that a generated value conforms to constraints specified in the data specification schema. For example, in an instance in which the data specification schema specifies that a generated number is to be within a particular range, process 400 can determine whether the generated number is within the specified range. As another example, in an instance in which the data specification schema specifies that a generated phone number (which may be generated by an external or third-party algorithm) is to have a particular number of digits, process 400 can determine whether the generated phone number conforms to the specified number of digits. In some embodiments, responsive to determining that a generated value (which may be generated by an external algorithm or by querying an external database) does not conform to or satisfy constraints specified in the data specification, process 400 can modify the generated value such that the modified value conforms to the constraints. For example, in an instance in which a generated phone number does not have the correct number of digits, process 400 can add or remove digits such that the modified phone number has the number of digits specified in the data specification schema.

Additionally, it should be noted that, in some implementations, to generate a single value associated with a particular field and for a particular test data object, process 400 may generate multiple sub-values that are combined or aggregated to generate the single value associated with the field for the test data object. In some implementations, each sub-value may be generated using different generators or the same generator. By way of example, in an instance in which a particular field is to store conversational text corresponding to a pizza order, the generated value for the field may need to include a first sub-value corresponding to a greeting and a second sub-value corresponding to a pizza size and type. Note that categories (e.g., greeting and pizza size) associated with each sub-value may be indicated in the data specification schema. Continuing with this example, process 400 may determine, from the data specification schema, a first generator to be used to generate the first sub-value and a second generator to be used to generate the second sub-value. Continuing still further with this example, process 400 may determine that the first sub-value is to be randomly selected from the group of potential greetings of: {"Hello, I would like a;" "Hi, I'd like to order a"}. Continuing still further with this example, process 400 may determine that the second sub-value is to be randomly selected from the group of potential pizza sizes and types of: {large cheese; medium peperoni; large veggie}. Continuing still further with this example, process 400 may generate the first sub-value by randomly selecting from the group of potential greetings and generate the second sub-value by randomly selecting from the group of pizza sizes and types, and then aggregate the first sub-value and second sub-value in a manner specified by the data specification schema to generate the value for the field. In one example, the generated value may be "Hi, I'd like to order a large veggie." In another example, the generated value may be "Hello, I would like a large cheese."

In some implementations, process 400 may store the generated value in any suitable manner. For example, in some implementations, process 400 may store the generated value as an element in a matrix or other type of data structure that is indexed by an identifier of the test data object and the field for which the generated value corresponds. In some such implementations, such a data structure may be stored in any suitable type of memory while the set of test data objects is being generated.

At 410, process 400 can determine whether process 400 has finished generating the test data objects. For example, process 400 can determine that the number of test data objects determined at block 404 have been generated, and therefore, that process 400 has finished generating the test data objects. Conversely, process 400 can determine that fewer than the number of test data objects determined at block 404 have been generated, and therefore, process 400 can determine that process 400 is not finished generating the test data objects.

If, at 410, process 400 determines that process 400 is not done generating the test data objects ("no" at 410), process 400 can loop back to block 408 and can generate another test data object. In some implementations, process 400 can loop through blocks 408-410 until the number of test data objects identified at block 404 have been generated.

Conversely, if, at 410, process 400 determines that process 400 is done generating the test data objects ("yes" at 410), process 400 can proceed to block 412 and can generate a tabular data file that includes or identifies the test data objects. For example, process 400 can generate a CSV, XLSX, JSON, XML, or similar type of file that includes the data associated with the generated test data objects. Examples of tabular data are shown in and described above in connection with FIGS. 2B and 3B. In some implementations, each test data object may be represented in the tabular data in connection with indications of the field names and values generated for each field name.

The generated tabular data may be provided in any suitable manner. For example, a file associated with the tabular data may be automatically stored, e.g., in local memory of a computing device of a user who provided the data specification schema at block 402, in the cloud, etc. In some implementations, a prompt to save a file associated with the tabular data may be presented, e.g., on a computing device of a user who provided the data specification schema at block 402.

The present disclosure describes techniques for generating realistic user test data, which may then be used during automated testing of software applications, sometimes referred to herein as an application under test (AUT). In some embodiments, the test data (e.g., a tabular data file, as described above in connection with FIGS. 1, 2B, 3B, and 4) may be generated responsive to a request from a computing device associated with a developer of an AUT. For example, such a request may be received at a data generation engine (e.g., data generation engine 102, as shown in and described above in connection with FIG. 1). The request may be received in connection with a data specification schema, which may be constructed and provided by the computing device associated with the developer of the AUT.

Figure 5:
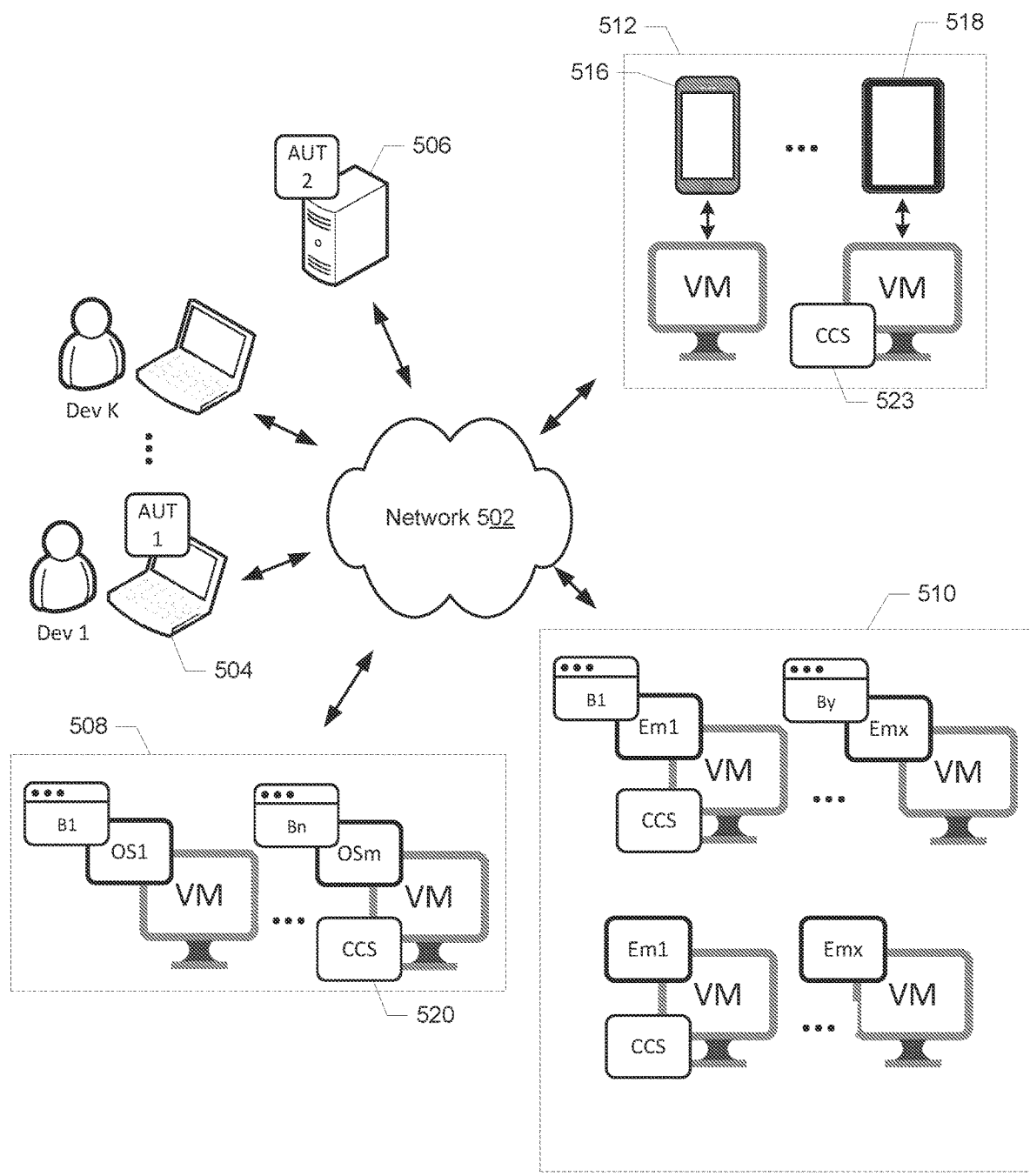
FIG. 5 is a schematic diagram of an example computing environment in accordance with some embodiments.

FIG. 5 depicts a computing environment in which application developers test their applications using resources on a cloud-hosted testing platform via network 502. Developers Dev 1 through Dev K represent a diverse community that may include anything from an individual developer on a single laptop to a team of developers on a wide area network at a large enterprise. The applications under test (AUTs) may reside on the same machine with which the developer is interacting with the test platform (e.g., as represented by AUT 1 on laptop 504), or on a separate machine (e.g., as represented by AUT 2 on server 506). The AUTs may be hosted in the public cloud with minimal security, or behind the enterprise-grade security of an enterprise network.

The virtual and hardware resources of the application testing platform are depicted in FIG. 5 as being include in resource pools 508-512. Resource pool 508 represents resources for testing web applications on potentially hundreds of browser and operating system (OS) combinations as represented by various combinations of browsers B1-B$n$ and operating systems OS1-OS$m$ on corresponding virtual machine (VM) instances. These VM instances may represent, for example, Windows, Mac, and Linux-based machines to name some representative examples.

Resource pool 510 represents resources for testing mobile web applications on potentially hundreds of mobile browser and mobile device emulator combinations as represented by various combinations of mobile browsers B1-B$y$ and emulators Em1-Em$x$ on corresponding VM instances, and resources for testing native mobile applications on potentially hundreds of mobile device emulators as represented by emulators Em1-Em$x$ on corresponding VM instances. The depicted emulators may represent, for example, iOS Simulators and Android Emulators to name some representative examples. And while the emulators are shown as operating on corresponding VMs, the developer will typically primarily interact with or automate on the emulators.

Resource pool 512 represents resources for testing both mobile web applications and native mobile applications on potentially hundreds of hardware mobile device types as represented by smart phone 516 and tablet 518 and the corresponding VM instances that manage the interaction with a corresponding mobile device during testing. The depicted devices may represent, for example, physical phones or tablets for Android and iOS to name some representative examples.

It should be noted that the test platform of FIG. 5 and other examples described herein show the use of VMs for exemplary purposes. It will be understood that other mechanisms for providing isolation among applications operating in a shared computing environment are contemplated to be within the scope of the present disclosure. Such other mechanisms include, for example, containers such as those provided by Docker, Inc., or CoreOS, Inc., both of San Francisco, California. The present disclosure will refer generally to VMs, containers, and other suitable mechanisms for providing isolation among applications in a computing environments as "virtual computing environment instances" or "VCEs." The present disclosure should therefore not be limited by reference to specific examples using VMs.

The platform supports a wide range of application testing use cases. A single developer might use the platform to manually run a single test of an AUT with one combination of testing resources. At the other end of the scale, a team of developers associated with a large enterprise can implement an automated testing framework at scale, running multiple tests of multiple AUTs on many different combinations of testing resources simultaneously. And depending on the AUT and the goals of a particular test, there may be one or many instances of the AUT with which the platform interacts for that test. The platform may also include control/capture services (e.g., CCS's 520-523 operating on respective VMs) that are capable of connecting with, exerting varying degrees of control over, and/or capturing state information from the platform's testing resources and/or the AUTs for correlation with other test-related information.

As will be appreciated, the depiction of resource pools 508-512 is for illustrative purposes. More generally, the application testing platform may conform to any of a wide variety of architectures including, for example, one or more platforms deployed at one or more co-locations, each implemented with one or more servers. Network 502 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. The computing devices with which developers connect to the testing platform may be any suitable device capable of connecting to network 502 and interacting with the testing resources.

Some implementations enabled by the present disclosure are based on computing models that enable ubiquitous, convenient, on-demand network access to both virtual and hardware resources from one or more shared pools of computing resources (e.g., mobile devices, virtual machines, containers, emulators, networks, servers, storage, applications, services, etc.). Virtual resources are thoroughly torn down or wiped and hardware resources thoroughly wiped once testing is complete to ensure the security of each developer's data. As will be understood, such computing resources may be integrated with and/or under the control of the same entity controlling the testing platform. Alternatively, such resources may be associated with other platforms that are at least partially controlled by other entities, e.g., a platform under control of a separate provider of cloud services and/or computing resources with which the testing platform and/or the developer connects to consume resources as needed. In another example, a developer or an enterprise might run their own cloud or cluster of computing devices such as, for example, a Kubernetes cluster, the documentation for which is distributed by the Linux Foundation®. Based on the foregoing, the diversity of variations within the scope of this disclosure will be appreciated by those of skill in the art.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

Figure 6:
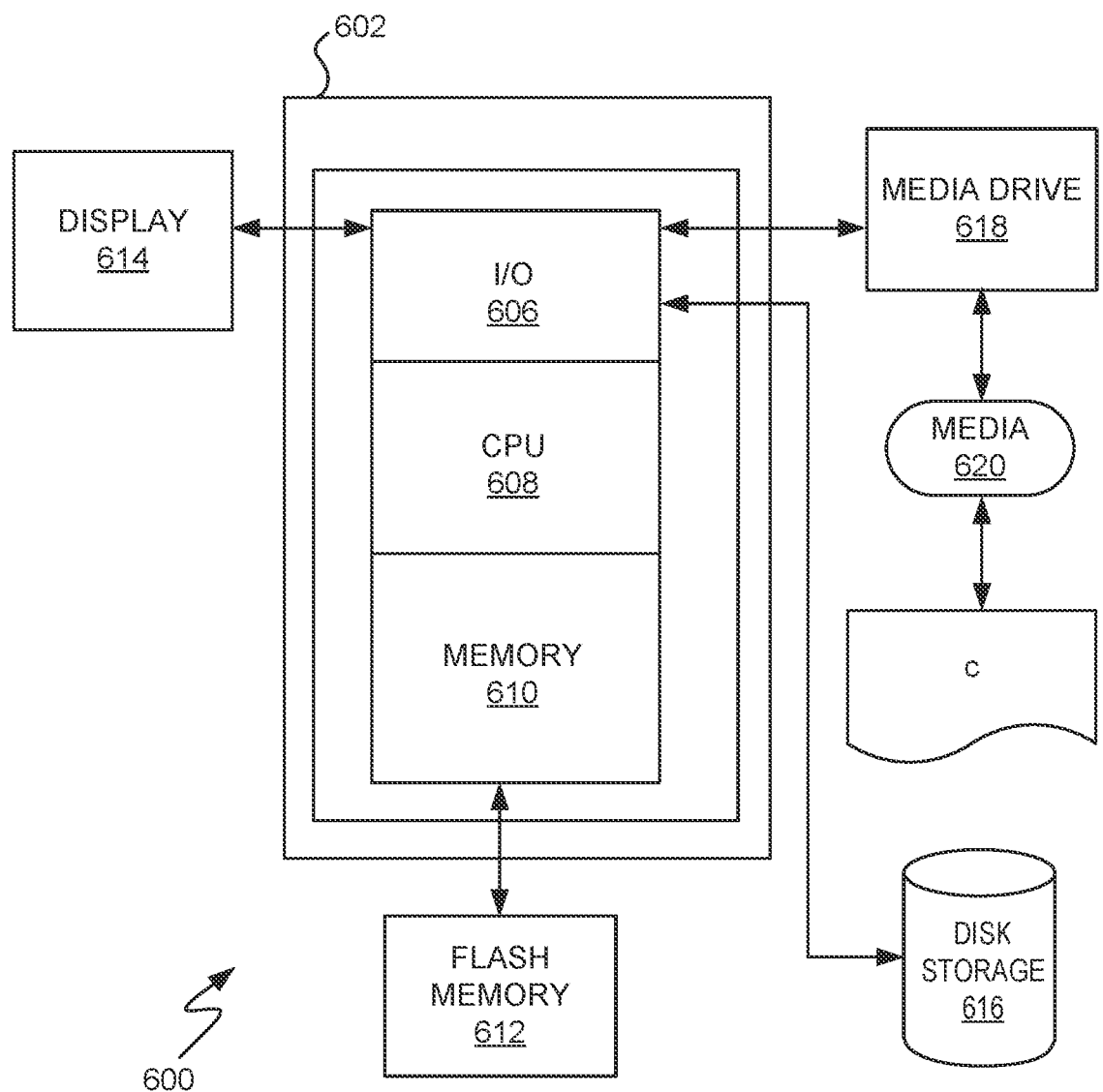
FIG. 6 is a schematic diagram illustrating components of an example computing system that may be used in connection with generating synthesized user data in accordance with some embodiments.

FIG. 6 is a schematic diagram that illustrates components of an example computing system 600. As illustrated, computing system 600 may include a computing device 602, which may be a laptop computer, a desktop computer, a tablet computer, a mobile phone, a server device, or the like. Computing device 602 may include input/output circuitry 606. Input/output circuitry 606 may include controllers or other circuitry for interfacing with various input devices, such as a keyboard, a mouse, a joystick, etc. In some implementations, input/output circuitry 606 may include circuitry for interfacing with a display 614. As illustrated, input/output circuitry 606 may interface (e.g., be operatively coupled to) with a media drive 618 and/or a disk storage 616. In some implementations, media drive 618 may be configured to retrieve media content items, such as media 620. Media 620 may include documents, audio content items, video content items, websites, and/or any other suitable type of media content.

Computing device 602 may include one or more processors, such as CPU 608. In some implementations, the one or more processors may include any suitable type of processor, such as a Graphics Processing Unit (GPU), etc. The one or more processors may be configured to perform any suitable functions or operations, such as receiving a data specification schema, parsing a data specification schema (e.g., to determine a number of test data objects to be generated, to determine a number of fields associated with each test data object, to determine a manner in which a value is to be generated for each field, etc.), generating values for different fields of a test data object, interfacing with external algorithms and/or databases, providing synthesized user data as tabular data, or the like. In some implementations, the one or more processors may be processors associated with data generation engine 102 and/or data export engine of FIG. 1. In some embodiments, the one or more processors may be configured to execute blocks of process 400 shown in and described above in connection with FIG. 4.

Computing device 602 may include and/or be operatively coupled to a memory 610 and/or a flash memory 612. Memory 610 may include a computer-readable medium (e.g., a non-transitory storage medium) or a combination of computer-readable media. Examples of computer-readable media include optical media (e.g., compact discs, digital video discs, or the like),magnetic media (e.g., hard disks, floppy disks, or the like),semiconductor media (e.g., flash memory, dynamic random access memory (DRAM), static random access memory (SRAM), electrically programmable read-only memory (EPROM), electrically erasable programmable read-only memory (EEPROM), or the like), or a combination thereof. In some embodiments, the computer-readable media includes non-volatile memory, volatile memory, or a combination thereof. In some embodiments, memory 610 may also include one or more hardware devices such as a solid-state memory, one or more hard drives, one or more optical disk drives, or the like. In some embodiments, memory 610 may store content files such as text-based files, audio files, image files, and/or video files, etc. In some implementations, the content files include documents, pictures, photos, songs, podcasts, movies, etc. In some embodiments, memory 610 may store one or more computer program products that are each implemented as a set of instructions (e.g., program code) stored on a computer-readable medium.

The techniques described herein may be implemented on a computer program product (e.g., a program stored in or downloadable onto a computer readable medium). The computer program product may include instructions or program code that are executable by one or more processors (e.g., CPU 608) to perform various operations or functions, such as those described with reference to FIGS. 1, 2A, 2B, 3A, 3B, and 4. In some implementations, a computer program product may be referred to as a non-transitory computer readable medium storing or comprising instructions to perform certain operations or functions. Examples of a computer program product include firmware, a software driver, a software application, etc.

Various embodiments are described herein which are intended to be illustrative. Alternative embodiments may be apparent to those of ordinary skill in the art without departing from the scope of the disclosure. For example, one or more features from one embodiment may be combined with another embodiment to form an alternative embodiment. As another example, one or more features may be omitted from an embodiment to form an alternative embodiment without departing from the scope of the disclosure. Additionally, it should be noted that, in some implementations, certain features described herein may be utilized without reference to other features described herein.

With reference to the various processes described above, it should be understood that the order in which operations are performed is not limited to the order described herein. Moreover, in some embodiments, two or more operations may be performed concurrently and/or substantially in parallel. In some embodiments, what is described as a single operation may be split into two or more operations (e.g., performed by the same device, performed by two or more different devices, etc.). In some embodiments, what is described as multiple operations may be combined into a single operation (e.g., performed by the same device, etc.). Descriptions of various blocks, engines, or components as distinct should not be construed as requiring that the blocks or components be separate (e.g., physically separate) and/or perform separate operations. For example, in some implementations, two or more blocks and/or components are merged. As another example, a single block and/or component is split into multiple blocks and/or components.

The phrases "in one embodiment," "in an embodiment," "in one example," and "in an example" are used herein. It should be understood that, in some cases, these phrases refer to the same embodiments and/or examples, and, in other cases, these phrases refer to different embodiments and/or examples. The terms "comprising," "having," and "including" should be understood to be synonymous unless indicated otherwise. The phases "A and/or B" and "A or B" should be understood to mean {A}, {B}, or {A, B}. The phrase "at least one of A, B, and C" should be understood to mean {A}, {B}, {C}, {A, B}, {A, C}, {B, C}, or {A, B, C}.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A method for generating synthesized user data, comprising:
   receiving a data specification schema that specifies characteristics of test data objects comprising synthetic user data, wherein the characteristics comprise a third-party data source that includes a natural language text generation algorithm;
   generating the test data objects, the generating of each test data object including:
   determining, from the data specification schema, a number of fields of the test data object to be populated, the fields representing categories of simulated user data, and
   determining values for the fields, the values simulating user data, wherein determining the values comprises:
   determining values for a first field by querying the third-party data source such that the third-party data source returns, responsive to the query, realistic synthetic user data used to populate the values for the at least one field comprising a sequence of a plurality of words, wherein the third-party data source is associated with an entity other than an entity generating the test data objects,
   determining values for a third field by generating a value associated with a second field and determining the value for the third field based on the generated value associated with the second field, wherein the data specification schema indicates that the third field is to have a value that is a function of the value associated with the second field, and
   determining values for a fourth field by querying a second third-party data source that is a database, wherein the data specification schema indicates a query provided to the database, and wherein a response to the query corresponds to the value associated with the fourth field;
   storing the test data objects in a database, the storing of each test data object including populating the fields with the determined values;
   generating a tabular data file including the test data objects; and
   transmitting the tabular data file to a computing system, wherein the computing system is configured to utilize the tabular data file comprising the realistic synthetic user data during a user data testing procedure of an application performed by the computing system.

2. The method of claim 1, wherein the data specification schema indicates a data type associated with each field of the number of fields.

3. The method of claim 1, wherein querying the third-party data source comprises requesting authentication to use the third-party data source using an authentication token specified in the data specification schema.

4. The method of claim 1, wherein the third-party data source comprises a third-party machine learning algorithm.

5. The method of claim 1, wherein the sequence of the plurality of words comprises at least one of: conversational text, a list, or instructions.

6. A system for generating synthesized user data, the system comprising:
   a memory; and
   one or more processors operatively coupled to the memory, the one or more processors configured to cause:
   receiving a data specification schema that specifies characteristics of test data objects comprising synthetic user data, wherein the characteristics comprise a third-party data source that includes a natural language text generation algorithm;
   generating the test data objects, the generating of each test data object including:

determining, from the data specification schema, a number of fields of the test data object to be populated, the fields representing categories of simulated user data, and determining values for the fields, the values simulating user data, wherein determining the values comprises:

determining values for a first field by querying the third-party data source such that the third-party data source returns, responsive to the query, realistic synthetic user data used to populate the values for the at least one field comprising a sequence of a plurality of words, wherein the third-party data source is associated with an entity other than an entity generating the test data objects, determining values for a third field by generating a value associated with a second field and determining the value for the third field based on the generated value associated with the second field, wherein the data specification schema indicates that the third field is to have a value that is a function of the value associated with the second field, and determining values for a fourth field by querying a second third-party data source that is a database, wherein the data specification schema indicates a query provided to the database, and wherein a response to the query corresponds to the value associated with the fourth field;

storing the test data objects in a database, the storing of each test data object including populating the fields with the determined values;

generating a tabular data file including the test data objects; and transmitting the tabular data file to a computing system, wherein the computing system is configured to utilize the tabular data file comprising the realistic synthetic user data during a user data testing procedure of an application performed by the computing system the tabular data file configured to be processed by one or more processors of a computing system during a user data testing procedure of the computing system.

7. The system of claim 6, wherein the data specification schema indicates a data type associated with each field of the number of fields.

8. The system of claim 6,, wherein querying the third-party data source comprises requesting authentication to use the third-party data source using an authentication token specified in the data specification schema.

9. The system of claim 6, wherein the third-party data source comprises a third-party machine learning algorithm.

10. The system of claim 6, wherein the sequence of the plurality of words comprises at least one of: conversational text, a list, or instructions.

11. A computer program product comprising computer readable program code capable of being executed by one or more processors when retrieved from a non-transitory computer-readable medium, the program code comprising instructions configurable to cause:

receiving a data specification schema that specifies characteristics of test data objects comprising synthetic user data, wherein the characteristics comprise a third-party data source that includes a natural language text generation algorithm;

generating the test data objects, the generating of each test data object including:

determining, from the data specification schema, a number of fields of the test data object to be populated, the fields representing categories of simulated user data, and determining values for the fields, the values simulating user data, wherein determining the values comprises:

determining values for a first field by querying the third-party data source such that the third-party data source returns, responsive to the query, realistic synthetic user data used to populate the values for the at least one field comprising a sequence of a plurality of words, wherein the third-party data source is associated with an entity other than an entity generating the test data objects, determining values for a third field by generating a value associated with a second field and determining the value for the third field based on the generated value associated with the second field, wherein the data specification schema indicates that the third field is to have a value that is a function of the value associated with the second field, and determining values for a fourth field by querying a second third-party data source that is a database, wherein the data specification schema indicates a query provided to the database, and wherein a response to the query corresponds to the value associated with the fourth field;

storing the test data objects in a database, the storing of each test data object including populating the fields with the determined values;

generating a tabular data file including the test data objects; and transmitting the tabular data file to a computing system, wherein the computing system is configured to utilize the tabular data file comprising the realistic synthetic user data during a user data testing procedure of an application performed by the computing system.

12. The computer program product of claim 11, wherein the data specification schema indicates a data type associated with each field of the number of fields.

13. The computer program product of claim 11, wherein querying the third-party data source comprises requesting authentication to use the third-party data source using an authentication token specified in the data specification schema.

14. The computer program product of claim 11, wherein the third-party data source comprises a third-party machine learning algorithm.

15. The computer program product of claim 11, wherein the sequence of the plurality of words comprises at least one of:

conversational text, a list, or instructions.

* * * * *